United States Patent [19]

Poad et al.

[11] 4,354,865
[45] Oct. 19, 1982

[54] AUTOMATIC GLASS WARE FORMING MACHINE WITH AUTOMATIC DOWN AND/OR STUCK BOTTLE REJECTION

[75] Inventors: William J. Poad, Brockport; Urbano J. DeSantis; Lewis W. McFadden, both of Brockway, all of Pa.

[73] Assignee: Brockway Glass Company, Inc., Brockway, Pa.

[21] Appl. No.: 259,568

[22] Filed: May 1, 1981

[51] Int. Cl.³ ............................................. C03B 35/00
[52] U.S. Cl. ........................................ 65/29; 65/158; 65/159; 209/3.2; 209/44.1; 209/525
[58] Field of Search .......................... 65/158, 159, 29; 209/3.2, 44.1, 523, 524, 525

[56] References Cited

U.S. PATENT DOCUMENTS

| | | | |
|---|---|---|---|
| 2,873,855 | 2/1959 | McCormick | 65/158 X |
| 2,915,638 | 12/1959 | Poole | 65/158 X |
| 3,270,881 | 9/1966 | Calhoun | 209/524 |
| 3,549,890 | 12/1970 | Keller | 209/525 |
| 3,716,136 | 2/1973 | Birner et al. | 209/525 |
| 3,730,325 | 5/1973 | Goodwin | 65/29 X |
| 3,955,179 | 5/1976 | Planke | 209/525 |
| 4,259,571 | 3/1981 | Dubberly | 209/524 |

Primary Examiner—Arthur D. Kellogg
Attorney, Agent, or Firm—Burns, Doane, Swecker & Mathis

[57] ABSTRACT

Apparatus for automatically removing stuck and down ware from an automatic glassware ware forming machine conveyor produces a first signal for each item of normal ware, stuck ware and down ware which is conveyed past an inspection location. Each of the first signals has a duration corresponding to the time required for passage of the corresponding item past the inspection location. The apparatus also produces a second signal simultaneously with the production of each of the first signals, the second signals having a predetermined duration corresponding to the time required for a normal upright and spaced item of ware to be conveyed past the inspection location. The generation of a reject signal during the duration of each of the second signals is inhibited and a reject signal is generated if a first signal is present after the termination of the corresponding second signal, which actuates a signal responsive automatic ware removal mechanism.

6 Claims, 5 Drawing Figures

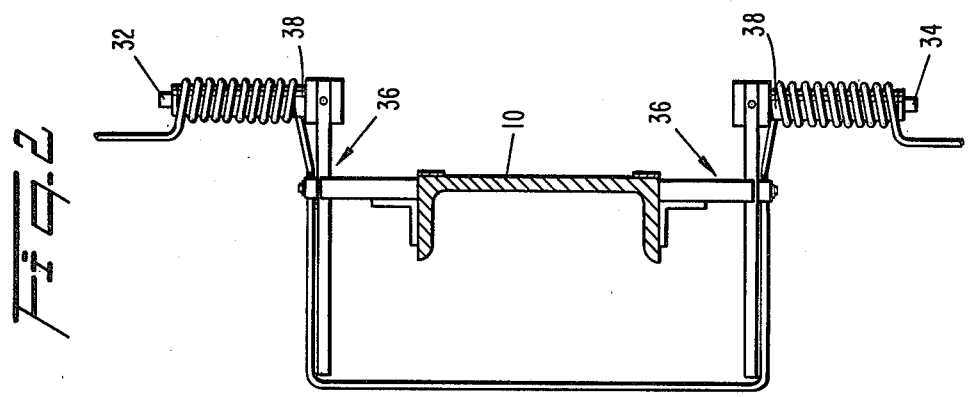
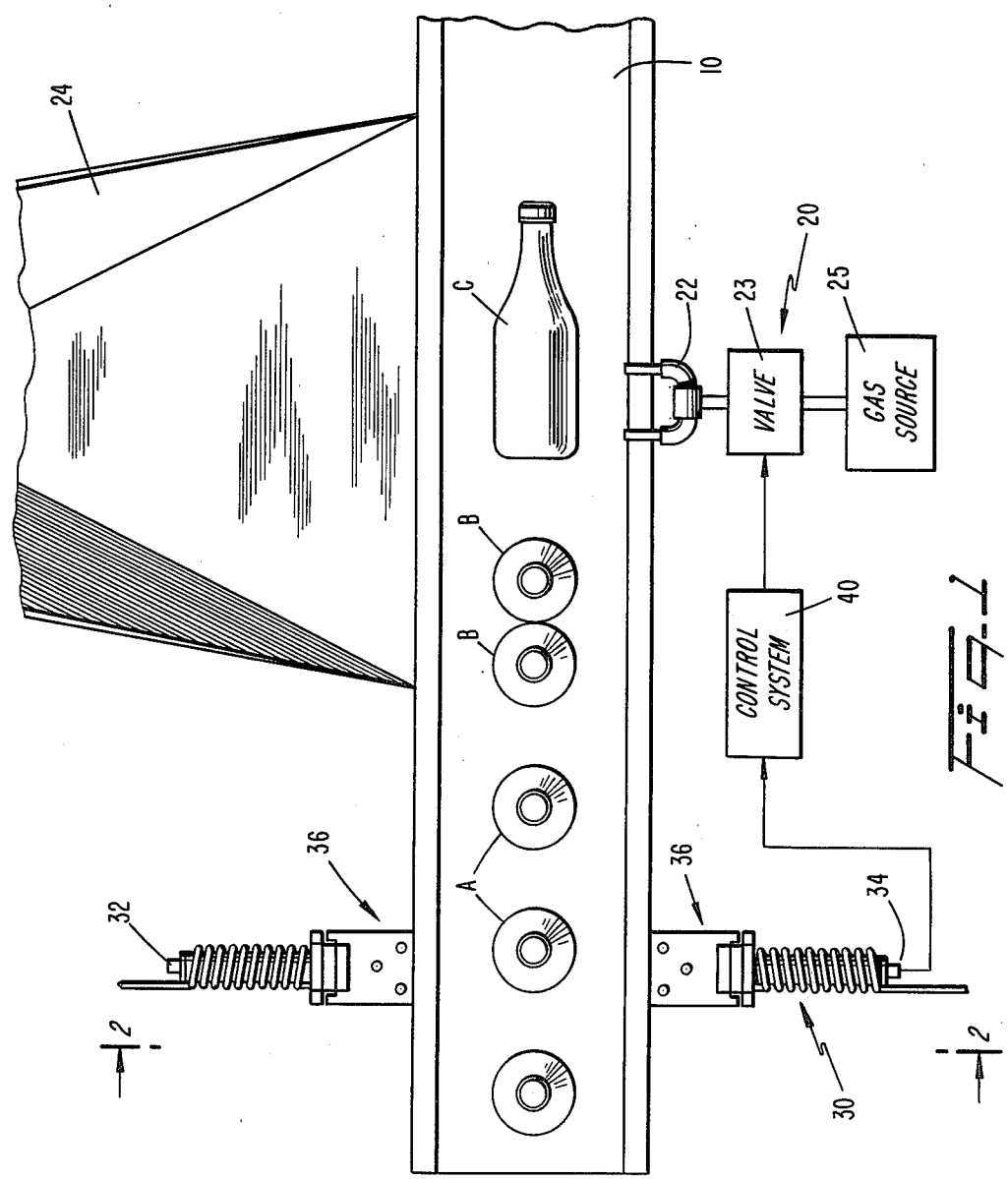

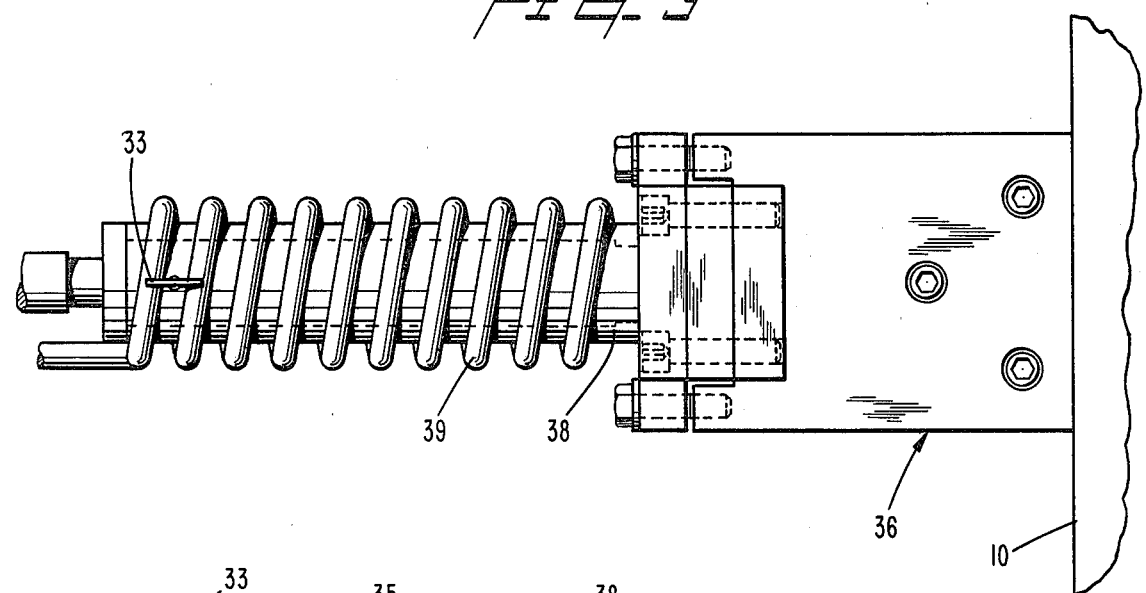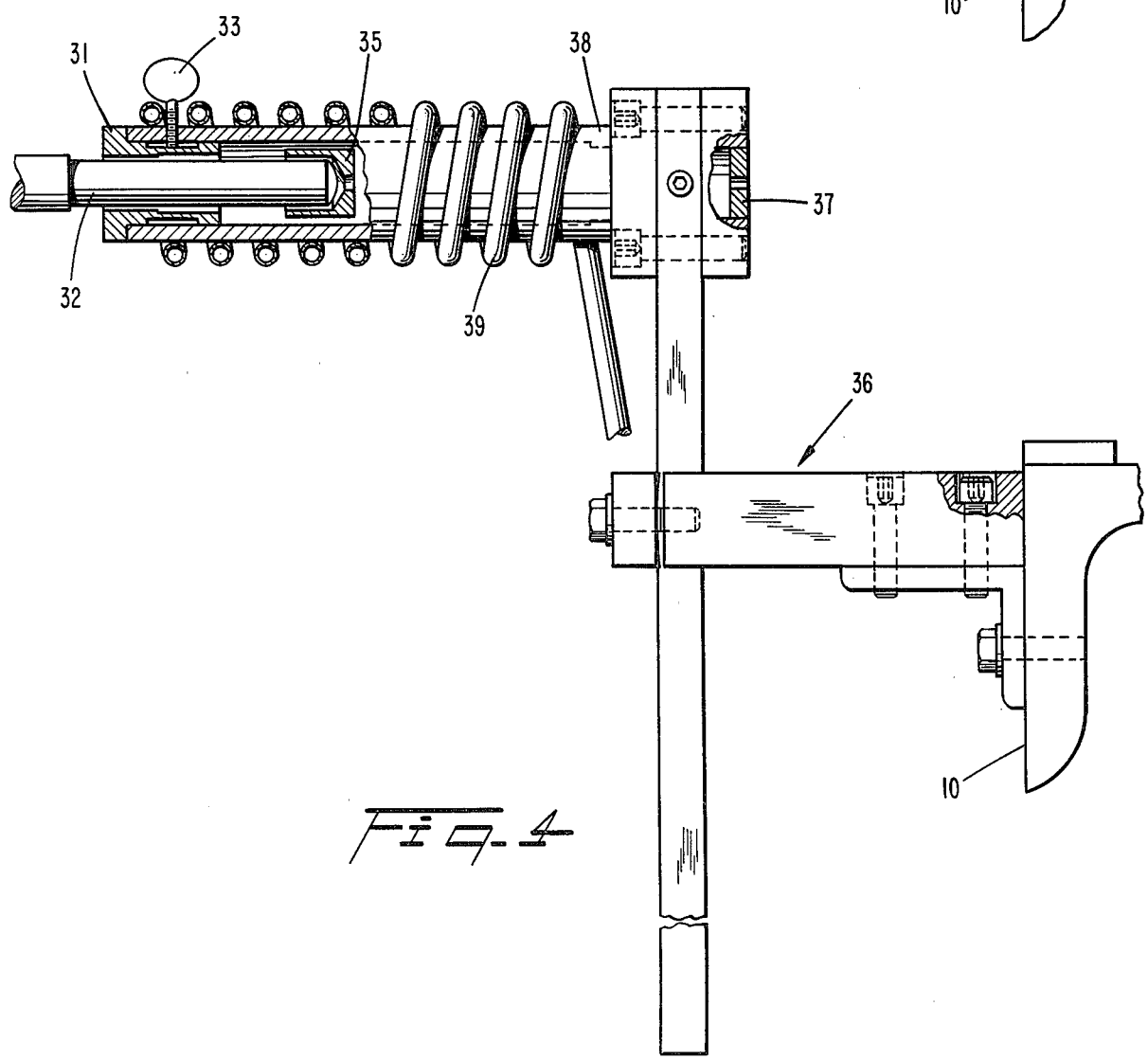

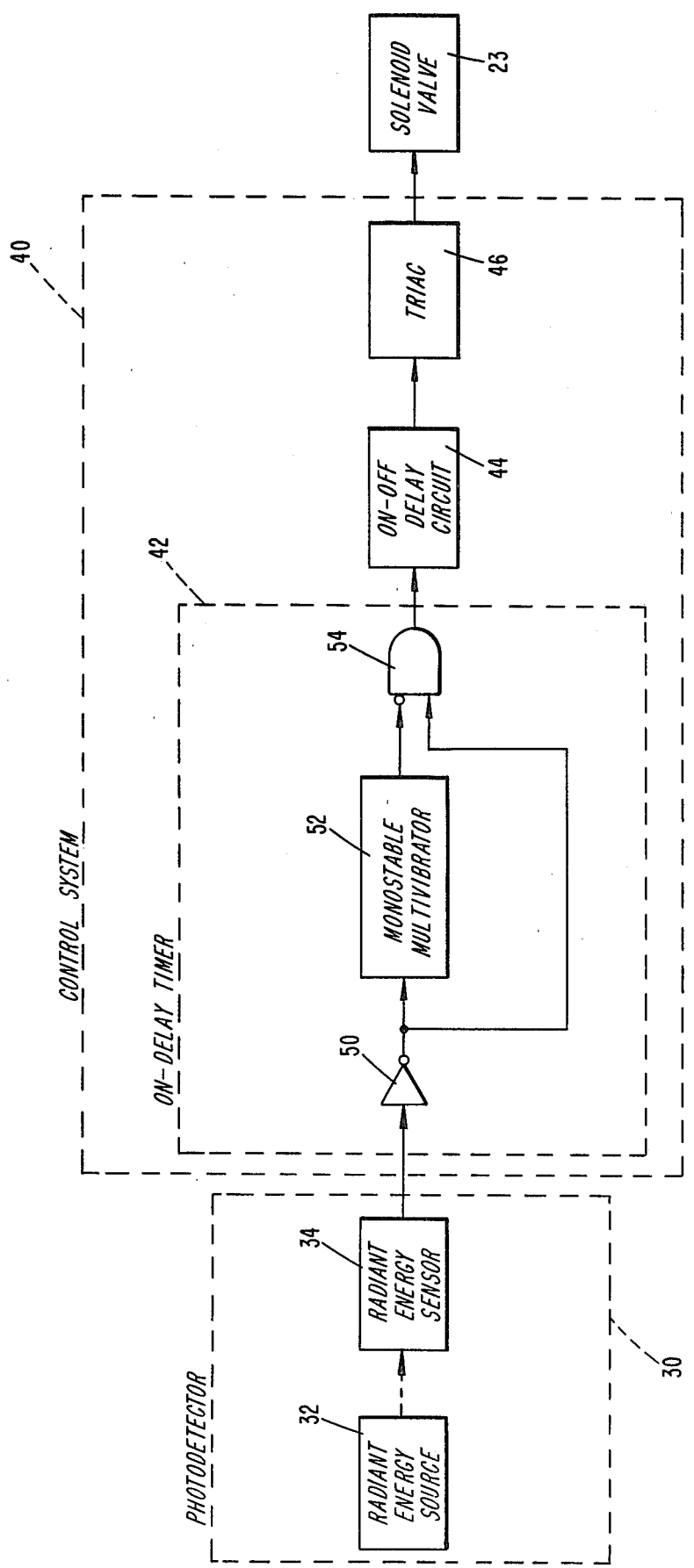

AUTOMATIC GLASS WARE FORMING MACHINE WITH AUTOMATIC DOWN AND/OR STUCK BOTTLE REJECTION

FIELD OF THE INVENTION

The present invention relates in general to automatic glass ware making machines with down and/or stuck ware reject systems, and in particular to down and/or stuck ware reject systems having photoelectric detectors and electronic control systems.

BACKGROUND OF THE INVENTION

In conventional automatic glass ware forming machines, hot ware such as bottles typically are set out in spaced relationship and in an upright orientation on a single line conveyor which transports the bottles to an annealing lehr. Occasionally two still-plastic bottles become stuck together and at other times bottles will dall down. Such stuck and fallen bottles interfere with proper operation of the lehr and cause jams at the stacker which pushes bottles off the conveyor into the lehr. Further, in machines where the bottles are sprayed with a protective coating prior to annealing, stuck and down bottles cause jams at the coating hood. It is thus desirable to remove stuck and down bottles from the conveyor and thus increase the efficiency of operation.

Automatic detection and rejection of stuck and down bottles is generally known in the art, and non-mechanical systems frequently employ photoelectric detectors. One example of such a rejector system is disclosed in U.S. Pat. No. 3,506,840 (Fink). In the Fink system, the angle of incidence of a radiation beam is adjusted such that radiation is reflected away from a sensor by upright bottles and is reflected back to the sensor by down bottles. The sensor output controls a reject device. The reject device may be located downstream from the sensor, in which case a memory device responsive to the sensor output is provided to delay triggering of the reject device.

Although they do not relate to stuck or down bottle rejection, applicants are aware of the prior art rejection systems disclosed in U.S. Pat. Nos. 3,606,013 (Wideman); 3,716,136 (Birner et al); and 3,837,486 (Gardner). The Wideman system is adapted for use with glass containers which are transported suspended from support forks and comprises a photodector system positioned at a predetermined elevation to detect bottles which are less than a predetermined minimum length. The light source is operated intermittently and operation thereof is synchronized with the line speed such that the detecting beam is generated at the time a bottle should be disposed in the path thereof. If the light path is not blocked, the sensor generates a control signal which is time-delayed by a signal delay device to actuate a reject mechanism located downstream from the inspection location.

Birner et al disclose a photoelectric inspection system for detecting misshapen containers in which a plurality of radiant energy beams are directed in predetermined relation to one another toward corresponding different, longitudinally spaced, portions of the formed containers. The output of various sensors positioned to detect portions of the beams are compared to determine whether the container portions are in proper relation to each other and to produce accept or reject control signals accordingly.

The Gardner system checks articles for proper shape or silhouette and utilizes a photoelectric detector to produce "diameter" pulses proportional in real time to the widths of articles being transported on a constant velocity conveyor. The diameter pulse is used to gate into a counter the output of a pulse generator synchronized with, and having a frequency proportional to, the speed of the conveyor. The counter count is then compared with predetermined maximum and minimum values and control signals for a downstream rejector device such as a conventional air nozzle are produced in dependence on the comparison. The reject control signal can be delayed for a predetermined period.

A principal disadvantage of prior art rejection systems is that they either require complex detection systems utilizing multiple radiation beams and sensors and/or require complex control logic and synchronization for controlling the detectors or analyzing the outputs produced thereby.

SUMMARY OF THE INVENTION

This and other disadvantages of the prior art are overcome in accordance with the present invention by producing a first signal for each time of normal ware, stuck ware and down ware which is conveyed past an inspection location, the first signals having durations corresponding to the time required for passage of the corresponding items past the inspection location. A second signal is produced simultaneously with the production of each first signal which has a predetermined duration corresponding to the time required for a normal upright and spaced item of ware to be conveyed past the inspection location. The generation of a reject signal is inhibited during the duration of each second signal and occurs only if a first signal is present after the termination of the corresponding second signal. Advantageously, actuation of a removal mechanism in response to a reject signal is delayed for a predetermined period to allow stuck or down ware to be conveyed to the removal location, and is limited to a predetermined duration such that normal ware following the rejected ware is not affected by the removal process.

Preferred apparatus constructed in accordance with the present invention comprises a detector producing a radiant energy beam which defines the inspection location and which is interrupted by the passage of normal ware, stuck ware and down ware for sensing the passage of the ware items and for producing the first control signals. Advantageously, the detector comprises a sensor which produces an output signal only when the radiation beam is uninterrupted, and an inverter connected to the sensor output to produce the first control signals.

Apparatus constructed in accordance with the present invention advantageously further comprises a monostable multivibrator responsive to the first signals for producing the second control signal and a gate to which the first control signals are connected and which is disabled by the second control signals.

These and other features and advantages of the present invention will be disclosed in or apparent from the following detailed description of a preferred embodiment.

BRIEF DESCRIPTION OF THE DRAWING

The preferred embodiment is described with reference to the accompanying drawing, in which:

FIG. 1 is a partially schematic plan view of a portion of apparatus constructed in accordance with the present invention.

FIG. 2 is an end view in the direction of arrows 2 and rotated 90° clockwise of a portion of the apparatus shown in FIG. 1.

FIG. 3 is an enlarged plan view of a portion of the apparatus shown in FIG. 1.

FIG. 4 is a side elevation view, partially broken away, of the apparatus portion shown in FIG. 3.

FIG. 5 is a schematic block diagram of the electrical portion of the apparatus shown in FIG. 1.

DETAILED DESCRIPTION OF A PREFERRED EMBODIMENT

Referring to FIG. 1, an automatic glass ware forming machine constructed in accordance with the present invention basically comprises a conventional single line conveyor 10 on which hot formed ware such as bottles A are transported from a conventional forming station (not shown) to further processing stations such as an annealing lehr (not shown); a conventional automatic removal mechanism 20 for removing bottles from conveyor 10 in response to electrical control signals; a photodetector 30 for monitoring bottles being transported on conveyor 10; and an electronic control system 40 producing control signals to actuate removal mechanism 20 as described in more detail hereinbelow to remove stuck bottle pairs and fallen, or "down", bottles in response to the output of photodetector 30.

As will be appreciated by those of ordinary skill in the art, conveyor 10 advantageously forms a part of a conventional Hartford I.S. glassware forming machine. For best operation of the system, bottles A advantageously are of substantially uniform dimensions and have a length which is greater than their diameter.

A conventional blow-off station, comprising a conventional nozzle 22 connected via a conventional solenoid-actuated valve 23 to a source of compressed air 25, and a cullet chute 24, advantageously constitutes removal mechanism 20. As will be appreciated by those of ordinary skill in the art, nozzle 22 produces at least one jet, and preferably two axially-spaced jets, of compressed air directed transversely across the travel path of bottles A. Nozzle 22 preferably is disposed such that the elevation thereof corresponds to the height of a down bottle. Cullet chute 24 is disposed oppositely across from nozzle 22 so as to receive rejected bottles displaced by nozzle 22.

Photodetector 30 preferably comprises a conventional radiant energy source 32 connected to a power source (not shown) and a corresponding conventional radiant energy sensor 34 disposed on opposite sides of conveyor 10. Source 32 preferably is oriented so as to transmit a radiation beam transversely to the path of travel of bottles A at an elevation which ensures that stuck bottles and down bottles, as well as normal bottles, intercept the beam as they travel past photodetector 30. Advantageously, a conventional modulated infrared radiation photodetector, such as one of the Honeywell Micro Switch FE-MLS series LED Scanners, constitutes photodetector 30 to provides ambient, incandescent and infra-red light source immunity without the need for any special shielding. A MLS4EB-1010 emitter and a MLS4RA-1011 receiver have proven satisfactory as source 32 and sensor 34, respectively. An embodiment of photodetector 30 comprising a Banner Engineering Corp. "Multi-Beam" fiber optic photoelectric scanner, such as the SBF high speed response unit, coupled to conventional signal conditioning circuitry, such as the Banner Engineering Corp. PBT power block triggered by the LM3 on-off logic module, has also proven satisfactory.

As shown particularly in FIGS. 3 and 4, photodetector 30 advantageously is mounted to conveyor 10 by bracket assemblies 36 which include separate housings 38 for source 32 and sensor 34. As shown, each housing 38 advantageously is surrounded by a cooling coil 39 through which cooling water is circulated. It will be appreciated by those of ordinary skill in the art that cooling is unnecessary when fiber optic embodiments of photodetector 30, which are designed for high operating temperatures, are employed, such as the aforementioned Banner Engineering Corp. unit. Each housing 38 also advantageously comprises, as shown, an aperture-defining shield member 35 covering the transmitting-/receiving end of source 32 sensor 34, and an aperture-defining end member 37 spaced from shield member 35 so as to provide a defined radiation beam from source 32 and a corresponding defined sensing window for sensor 34. Advantageously, source 32 and sensor 34 are releasably mounted in their respective housings 38 by means of a flexible annular clamping insert 31 in each housing which is tightened by a conventional thumb screw 33 mounted through the housing wall, as shown in FIG. 4. Alternatively, a plurality of set screws (not shown) mounted through the housing wall may be employed to releasably mount source 32 and sensor 34 in a conventional manner.

As shown in FIG. 5, electronic control system 40 advantageously comprises a conventional adjustable on-delay timer 42 responsive to the output of photodetector sensor 34 for producing a first control signal output when the radiation beam of photodetector 30 is blocked for longer than a preset time delay; a conventional adjustable on-off delay circuit 44 responsive to the control signal output of timer 42 for producing a second control signal output having a predetermined duration after a predetermined time delay following generation of the first control signal; and a conventional triac 46 responsive to the second control signal produced by delay circuit 44 for actuating removal mechanism valve 23.

An illustrative circuit for implementing timer 42 is schematically illustrated in FIG. 5 and comprises a conventional inverter 50 for producing an output signal when the output of sensor 34 falls below a predetermined level; a conventional "one-shot" or monostable multivibrator 52 which is triggered by the output of inverter 50 and which produces an output signal of predetermined duration that may be varied by the system operator; and a conventional inhibit gate 54, the inhibit input of which is connected to the output of multivibrator 52 and the signal input of which is connected to the output of inverter 50. As will be appreciated by those of ordinary skill in the art, gate 54 will produce an output only when an output signal from inverter 50 is present and an output signal from multivibrator 52 is not present. Advantageously, a trailing edge- or pulse-triggered embodiment of multivibrator 52 is employed such that there must be a low-high transition in the output of inverter 50 before multivibrator 52 is again triggered. When the Honeywell Micro Switch embodiments of photodetector source 32 and sensor 34 referred to hereinabove are employed, the Honeywell Micro Switch amplifier FE-LOG5 (FE- TR5), which according to a Honeywell catalog description is "[o]ften used to provide jam-up protection on conveyors and production equipment, where the normal flow of material or parts will not turn the amplifier ON", advantageously constitutes on-delay timer 42.

As will be appreciated by those of ordinary skill in the art, on-off delay circuit 44 advantageously comprises a conventional adjustable time delay circuit (not shown) in series with a conventional adjustable, preferably edge- or pulse-triggered, one-shot, or monostable, multivibrator having an adjustable time constant (not shown). When the Honeywell Micro Switch embodiments of photodetector 30 and on-delay timer 42 described hereinabove are employed, a Honeywell Micro Switch FE-LOG8B (FE-TR8B) delay advantageously constitutes on-off delay circuit 44.

In order to prepare control system 40 for operation with a particular embodiment of conveyor 10 and particular bottles A, on-delay timer 42 is adjusted such that the duration of the output thereof corresponds to the period of time the radiation beam produced by photodetector 30 is interrupted by properly spaced and upright bottles A as they are conveyed passed photodetector 30. As will be appreciated by those of ordinary skill in the art, this adjustment may be accomplished by initially setting timer 42 so as to cause all bottles to be rejected and then changing the setting until rejection of acceptable bottles just ceases.

The turn-on time delay of circuit 44 is also adjusted such that the second control signal for actuation of reject mechanism 20 is not triggered until the stuck bottles or down bottle which generated the corresponding first control signal has reached the location of nozzle(s) 22. It will be appreciated by those of ordinary skill in the art that the length of the delay is a function of the speed of conveyor 10 and the distance between the locations of photodetector 30 and removal mechanism 20. The turn-off time delay of circuit 44 is also adjusted to limit the duration of the air jet(s) from nozzle 22 such that only the ware to be rejected is blown into cullet chute 24 without affecting acceptable following ware.

The operation of the system described hereinabove to monitor and reject stuck or down bottles should be apparent from the foregoing. Normal bottles, i.e., bottles which are spaced from other bottles and upright, such as bottles A in FIG. 1 interrupt the radiation beam produced by photodetector source 32 for a period which is less than the duration of the corresponding first-control-signal-inhibiting output signals which are produced by on-delay timer 42 when the bottles first interrupt the radiation beam. Thus, the output signal of inverter 50, which is produced when the output of photodetector sensor 34 is low, corresponding to the time when a bottle blocks the radiation beam from being sensed, is of shorter duration than the output signal of multivibrator 52 which it triggers. Hence, inhibit gate 54 remains disabled during the entire period the output signal of inverter 50 is present, and no first control signal is produced. Since no first control signal is produced, no second control signal is produced and removal mechanism 20 is not activated.

Stuck or down bottles, such as bottles B and C, respectively, shown in FIG. 1, interrupt the photodetector radiation beam for a period which is longer than the duration of the corresponding first-control-signal-inhibiting output signals which are produced by on-delay timer 42 when reject bottles B or C first interrupt the radiation beam. Thus, the output signal of inverter 50 is still present after the output signal of multivibrator 52 which it triggers ceases, and gate 54 produces a first control signal output. The first control signal triggers delay circuit 44, which produces the second control signal after the predetermined turn-on time delay. The second control signal activates triac 46 for the duration of the second control signal, which causes solenoid valve 23 of removal mechanism 20 to be opened for a period corresponding to the predetermined turn-off delay. Thus, activation of removal mechanism 20 is delayed following detection of stuck bottles B or a down bottle C until the bottle(s) to be rejected have reached removal mechanism 20. Removal mechanism 20 is then activated to produce the air jet(s) which blow the rejected bottle(s) for a period of time just sufficient to remove the rejected bottle(s) from conveyor 10 without affecting following normal bottles A.

It will also be appreciated by those of ordinary skill in the art that the present invention is not restricted to the disclosed preferred embodiment and that changes and modifications may be made therein without departing from the scope and spirit of the invention.

We claim:

1. The combination, an automatic glass were forming machine comprising a conveyor on which a single line of normally upright, still plastic wares of substantially uniform size and having a greater length than diameter are transported for further processing in spaced relationship with respect to each other, and automatic stuck and down ware rejection apparatus comprising:

detecting means for sensing the passage of normal ware, stuck ware and down ware past an inspection location and for producing a first signal for each item of sensed normal ware, stuck ware and down ware having a duration corresponding to the time required for the corresponding sensed item to be conveyed past said inspection location;

means responsive to each of said first signals for producing a second signal having a predetermined duration corresponding to the time required for a normal upright and spaced ware to be conveyed past said inspection location;

means responsive to each of said first and second signals for producing a reject signal when said first signal exceeds said second signal in duration, which corresponds to the detection of stuck ware or down ware; and removal means responsive to said reject signal for removing the stuck ware or down ware which generated said reject signal.

2. The combination of claim 1 wherein said detecting means comprises source means for producing a radiant energy beam defining said inspection location, said radiant energy beam being directed transversely across said conveyor so as to be interrupted by the passage of normal ware, stuck ware and down ware, and sensor means for producing an output signal only when said radiant energy beam is uninterrupted; and inverter means for producing said first signal when said sensor means produces no output; and wherein said means responsive to said first signal comprises a monostable multivibrator having an adjustable time constant, and said means responsive to said first and second signals comprises an inhibit gate having the inhibit input thereof connected to said second signal and having the signal input thereof connected to said first signal.

3. The combination of claim 1 or 2 wherein said removal means comprises signal responsive automatic means for producing at least one jet of compressed gas directed transversely across said conveyor at a removal location disposed downstream from said inspection location, means responsive to said reject signal for producing an actuating signal to actuate said jet producing means after a predetermined time interval following generation of said reject signal such that the stuck ware or down ware responsible for said reject signal has been conveyed to said removal location at the time said jet producing means is actuated.

4. The combination of claim 3 wherein said removal means comprises means for limiting said actuating signal to a predetermined duration such that normal ware following rejected stuck ware or down ware are not affected by actuation of said jet producing means.

5. A method of detecting and removing stuck ware and down ware from a moving conveyor line of normally upright, spaced and still plastic wares of substantially uniform size and having a greater length than diameter, the method comprising the steps of:

producing a first signal for each item of normal ware, stuck ware and down ware which is conveyed past an inspection location, each of said first signals having a duration corresponding to the time required for passage of the corresponding item past said inspection location, producing a second signal simultaneously with the production of each of said first signals, said second signals having a predetermined duration corresponding to the time required for a normal upright and spaced item of ware to be conveyed past said inspection location;

inhibiting the generation of a reject signal during the duration of each of said second signals and generating said reject signal if a first signal is present after the termination of the corresponding second signal; and actuating signal responsive automatic ware removal means in response to said reject signal.

6. The method of claim 5 wherein said rejection means is disposed downstream from said inspection location and the method comprises the further step of delaying actuation of said removal means for a predetermined time period following production of said reject signal such that the stuck ware or down ware producing said reject signal has been conveyed to said removal means at the time said removal means is actuated.

* * * * *